(12) United States Patent
Arita et al.

(10) Patent No.: US 7,131,179 B2
(45) Date of Patent: Nov. 7, 2006

(54) MOUNTING STRUCTURE AND METHOD OF MOUNTING A COMPONENT IN A STRUCTURE

(75) Inventors: Tsunefumi Arita, Tokyo (JP); Hideyasu Ihira, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 105 days.

(21) Appl. No.: 10/992,100

(22) Filed: Nov. 19, 2004

(65) Prior Publication Data

US 2005/0150099 A1 Jul. 14, 2005

(30) Foreign Application Priority Data

Nov. 28, 2003 (JP) .............................. 2003-399750

(51) Int. Cl.
*B23P 11/00* (2006.01)
*F16K 51/00* (2006.01)

(52) U.S. Cl. ................................ 29/525.01; 29/525.11; 29/890.124; 29/890.126; 29/890.132; 251/143; 251/129.15; 248/309.1; 248/346.01

(58) Field of Classification Search ............ 29/525.01, 29/525.11, 525.13, 525.02, 890.124, 890.126, 29/890.128, 890.132; 137/343; 251/129.15, 251/143; 123/490; 248/346.01, 309.1
See application file for complete search history.

(56) References Cited

U.S. PATENT DOCUMENTS

| 4,524,797 A | * | 6/1985 | Lungu ........................ 137/343 |
| 4,564,046 A | * | 1/1986 | Lungu .................... 137/625.65 |
| 4,893,645 A |   | 1/1990 | Augustinas et al. |
| 5,269,490 A | * | 12/1993 | Fujikawa et al. ...... 251/129.15 |
| 5,393,133 A | * | 2/1995 | Fujimoto .................. 303/119.2 |
| 5,613,290 A | * | 3/1997 | Alfors .......................... 29/434 |
| 6,170,516 B1 | * | 1/2001 | Sakata et al. ................ 137/343 |
| 6,443,344 B1 |   | 9/2002 | Nicosia et al. |
| 6,607,172 B1 | * | 8/2003 | Green et al. ............. 248/309.1 |
| 7,028,978 B1 | * | 4/2006 | Kumar ................... 251/129.07 |

FOREIGN PATENT DOCUMENTS

| EP | 0 559 197 A2 |   | 9/1993 |
| EP | 0 873 932 A2 |   | 10/1998 |
| FR | 2 743 117 |   | 12/1995 |
| JP | 10-173402 |   | 6/1998 |
| JP | 2000161151 A | * | 6/2000 |
| JP | 2001-056005 |   | 2/2001 |
| JP | 2001-56005 |   | 2/2001 |
| JP | 2002031263 A | * | 1/2002 |
| JP | 2005163816 A | * | 6/2005 |

\* cited by examiner

*Primary Examiner*—Essama Omgba
(74) *Attorney, Agent, or Firm*—Rabin & Berdo, PC

(57) ABSTRACT

A main body 110 of a component comprises a projection 120 protruding from an axis thereof in the direction of a normal, a fitting shaft portion 111 to be fitted into an opening 811 of a structure 810, and a mounting plate portion 130 including a bolt inserting hole 131*a* to mount and fix the main body 110 to the structure 810. The mounting plate portion 130 is formed with a notched groove 132 communicating with the bolt inserting hole 131*a*. The mounting plate portion 130 is fixed with a tightening bolt 820 which is screwed in the structure 810.

6 Claims, 3 Drawing Sheets

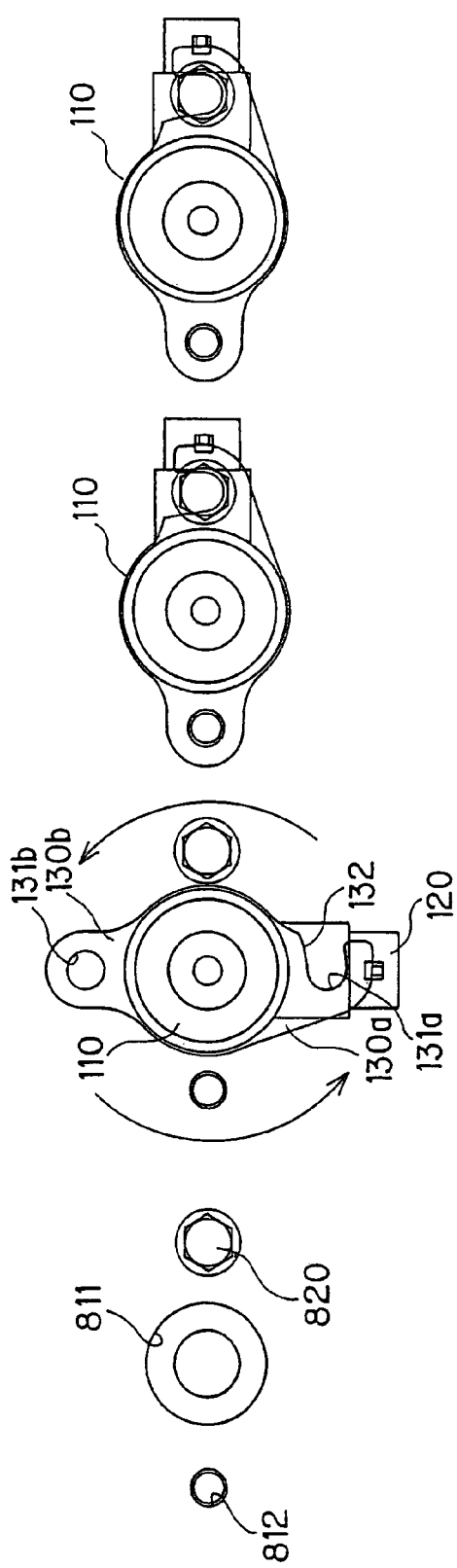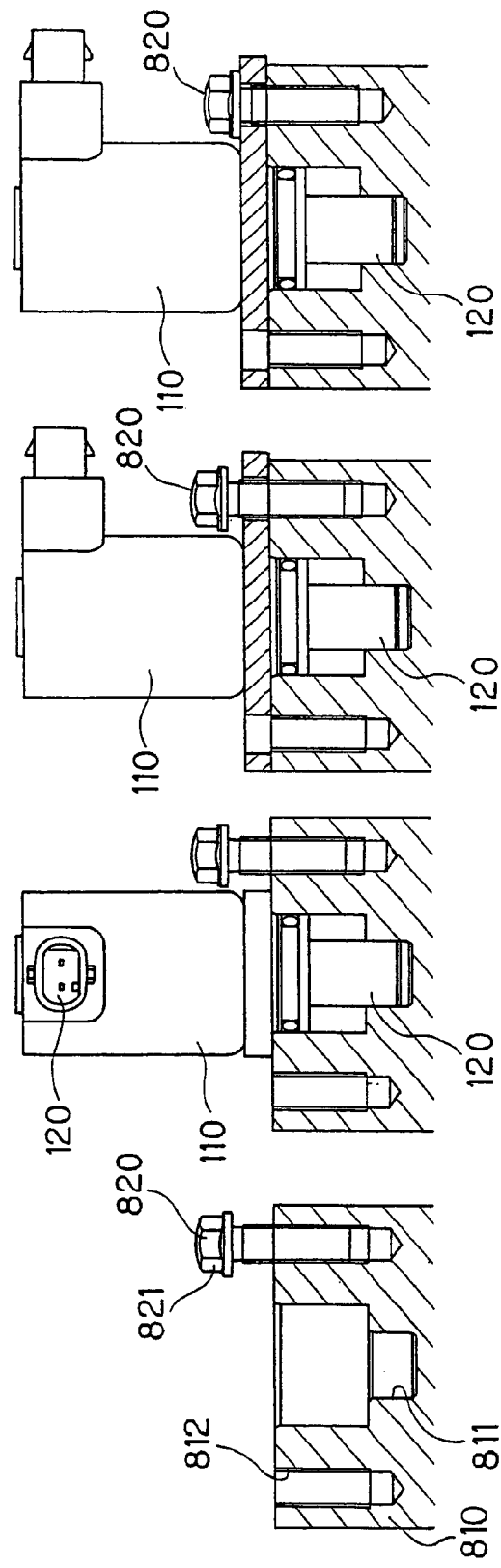
FIG. 3(a) FIG. 3(b) FIG. 3(c) FIG. 3(d)

MOUNTING STRUCTURE AND METHOD OF MOUNTING A COMPONENT IN A STRUCTURE

BACKGROUND OF THE INVENTION

1. Field of the Invention

The present invention relates to a mounting structure and a method of mounting a component in a structure.

2. The Related Art of the Invention

When a valve, a measuring instrument or the like, such as a change-over valve, a flow rate sensor, or a pressure sensor, is mounted in a structure incorporating a flow channel for a fluid, the structure is provided with an opening communicating with the flow channel for the fluid, and in many cases, the measuring instrument or the like is fitted into this opening.

The measuring instrument or the like is fixed to the structure with a bolt, and in such case, if there is a projection such as a connector of the measuring instrument in an axial direction of the bolt, a bolt tightening operation cannot be carried out smoothly.

Meanwhile, there are examples of the art relating to a mounting structure for a component, which are disclosed in Japanese Unexamined Patent Publication No.10-173402 and Japanese Unexamined Patent Publication No.2001-56005.

SUMMARY OF THE INVENTION

It is an object of the present invention to facilitate mounting of a component such as a measuring instrument in a structure. To this end, according to the present invention, a mounting structure for a component to be fitted into an opening of a structure and fastened to the structure with a bolt comprises a main body of the component, a fitting shaft portion extending axially from the main body and to be fitted into the opening, a mounting plate portion connected to a trunk portion of the main body and extending in a direction orthogonal to an axial center of the main body, a projection protruding from the axial center of the main body in a direction orthogonal thereto, a bolt inserting hole disposed in the mounting plate portion, at least one bolt inserting hole being disposed at a position overlapping with the projection in the axial direction of the main body, and a notched groove disposed in the plate portion to connect with the bolt inserting hole disposed at a position overlapping with the projection, the notched groove extending in a substantially circumferential direction of a circle around the fitting shaft portion.

BRIEF DESCRIPTION OF THE DRAWINGS

FIGS. 3(a)–3(d) shows a method of attaching and fixing a bolt in one preferred embodiment according to the present invention. FIG. 3A shows a primary bolt tightening process, FIG. 3B shows a fitting process, FIG. 3C shows a rotating and fitting process, and FIG. 3D shows a secondary bolt tightening process.

DETAILED DESCRIPTION OF THE PREFERRED EMBODIMENT

A preferred embodiment of the present invention will be described below with reference to the accompanying drawings. However, the following embodiment just shows a preferred embodiment of the present invention, and the technical scope of the present invention is not limited to the following embodiment. For instance, the present embodiment describes an example in which the present invention is applied to a solenoid valve, but it will be obvious that it is similarly applicable to a potentiometer, a flow rate sensor or the like instead of the solenoid valve.

Figure 1:
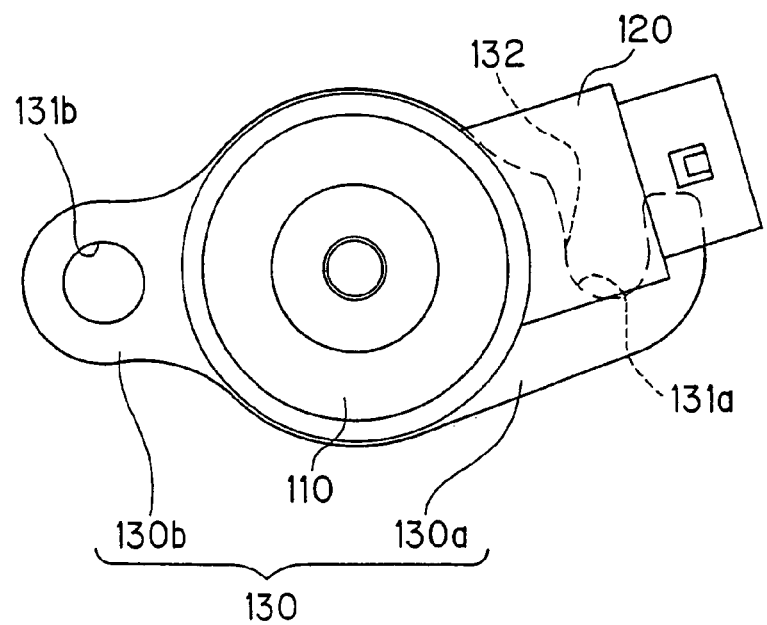
FIG. 1 is a plan view showing a solenoid valve in one preferred embodiment according to the present invention.
Figure 2:
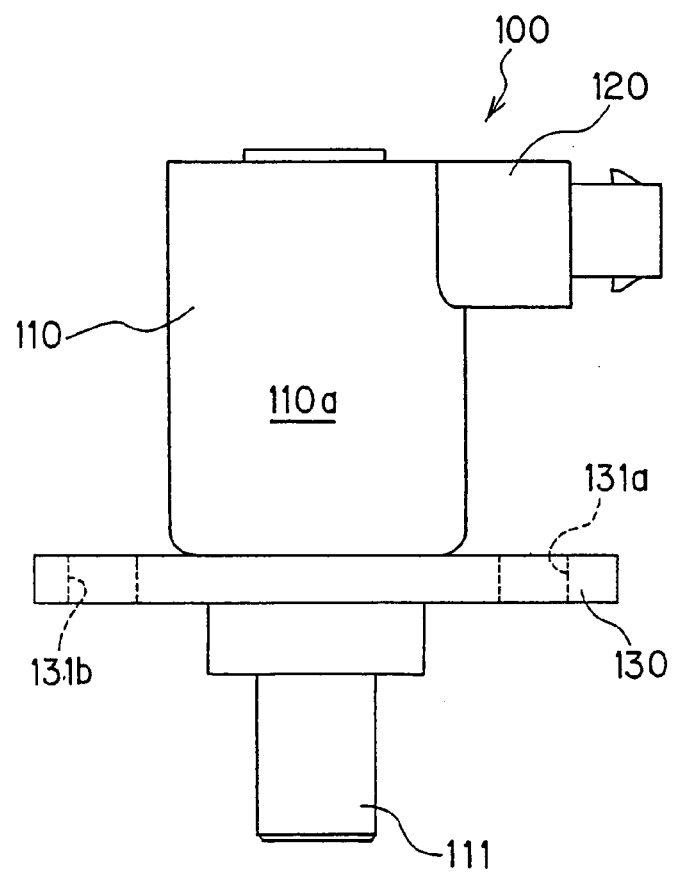
FIG. 2 is a side view of the solenoid valve in FIG. 1.

FIG. 1 is a plan view showing a solenoid valve 100 as a component to be mounted in a structure as one preferred embodiment according to the present invention, and FIG. 2 is a side view of the solenoid valve 100, which is attached to a structure 810 in FIGS. 3(a)–3(d).

As shown in FIG. 1 and FIG. 2, the solenoid valve 100 is constructed by providing a main body 110 with a projection 120 and a mounting plate portion 130.

The main body 110 is formed in the shape of, for example, a cylinder or a square cylinder, and has a valve, a solenoid for driving the valve, and the like disposed in an inside thereof. At a tip of the main body 110, a cylindrical fitting shaft portion 111 is coaxially formed, and the fitting shaft portion 111 is fitted into an opening 811 provided in the structure 810.

The structure 810 has a flow channel for a fluid provided therein and the opening 811 communicates with the inside flow channel. Fitting the fitting shaft portion 111 into the opening 811 enables the solenoid valve 100 to control a flow of the fluid running through the structure 810.

The projection 120 is formed of a connector or the like connected to the solenoid incorporated in the main body and is disposed so as to protrude from an outer peripheral wall of the main body 110 in the direction of a normal thereto. The projection 120 is located such that it interferes with at least either one of bolt inserting holes 131a and 131b in the mounting plate portion 130 to be later described with respect to the axial center direction of the main body. The figures just show a type that causes interference only with one bolt inserting hole 131a.

The mounting plate portion 130 is fixed at a bottom end of a trunk portion 110a of the main body 110 to mount and fix the main body 110 to the structure 810 with a bolt 820. The mounting plate portion 130 is provided, at approximately 180-degrees opposed positions around the main body 110, with a pair of arm pieces 130a and 130b so that they protrude therefrom, and the bolt inserting holes 131a and 131b are formed in these arm pieces 130a and 130b, respectively. Further, in at least one arm piece 130a, a notched groove 132 communicating with the bolt inserting hole 131a is formed. The notched groove 132 extends in a circumferential direction of a circle around the axial center of the fitting shaft portion 111, and is formed to have a groove width equal to or larger than a diameter of the bolt inserting hole 131a.

The bolt 820 is preliminarily screwed halfway into a bolt screwing hole 812 formed in the structure 810, and in this state, the fitting shaft portion 111 is fitted into the opening 811 of the structure 810 and the main body 110 is rotated. As a result, the bolt 820 can be guidedly introduced through the notched groove into the bolt inserting hole 131a.

Next, referring to FIGS. 3(a)–3(d), a method of mounting and fixing the solenoid valve 100 constructed as above to the structure 810 will be described in detail.

First, a primary bolt tightening process is performed in FIG. 3A. The bolt 820 is screwed halfway into one bolt screwing hole 812. In this case, the bolt 820 is tightened down to a depth at which a head portion 821 of the bolt 820 does not interfere with the mounting plate portion 130.

Next, a process of fitting the main body 110 is performed as shown in FIG. 3B. At a position where the bolt 820 screwed into the bolt screwing hole 812 does not interfere with the mounting plate 130, the fitting shaft portion 111 of the main body 110 is fitted into the opening 811 of the structure 810, and the opening 811 is thereby blocked hermetically.

Then, a rotating and fitting process is performed as shown in FIG. 3C. Rotating the main body 110 around the fitting shaft portion 111 allows the bolt 820 screwed into the bolt screwing hole 812 to be fitted in a proper position of the bolt inserting hole 131a through the notched groove 132.

And then, a secondary bolt tightening process is performed as shown in FIG. 3D. The bolt 820 screwed into the bolt screwing hole 812 is tightened to a final tightening position. Thereafter, a bolt 820 is screwed also into another bolt screwing hole 812 and tightened, which is not illustrated in FIGS. 3(a)–3(d).

As described above, even if the projection 120 such as the connector, as viewed from an axial direction of the solenoid valve, is of a shape that causes interference with the bolt inserting hole 131a formed in the mounting plate portion 130, at the time of an initial bolt tightening, the projection 120 can be moved to a position where the bolt tightening operation is not disturbed. Thus, the tightening operation can be carried out efficiently. Further, the initial bolt tightening operation can be carried out mechanically (automatically), not manually by a worker. In such case, it will be possible to shorten a production cycle time (tact time), thereby leading to an improved productivity and a reduced labor cost.

Figure 4B:
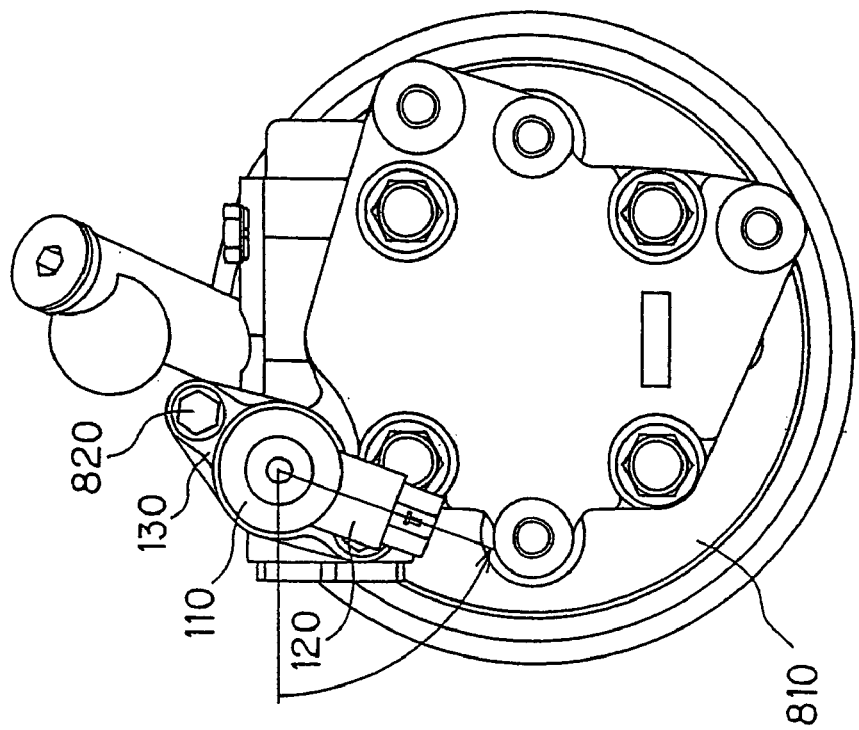
FIG. 4A and FIG. 4B are diagrams showing different states of mounting of a solenoid valve.
Figure 4A:
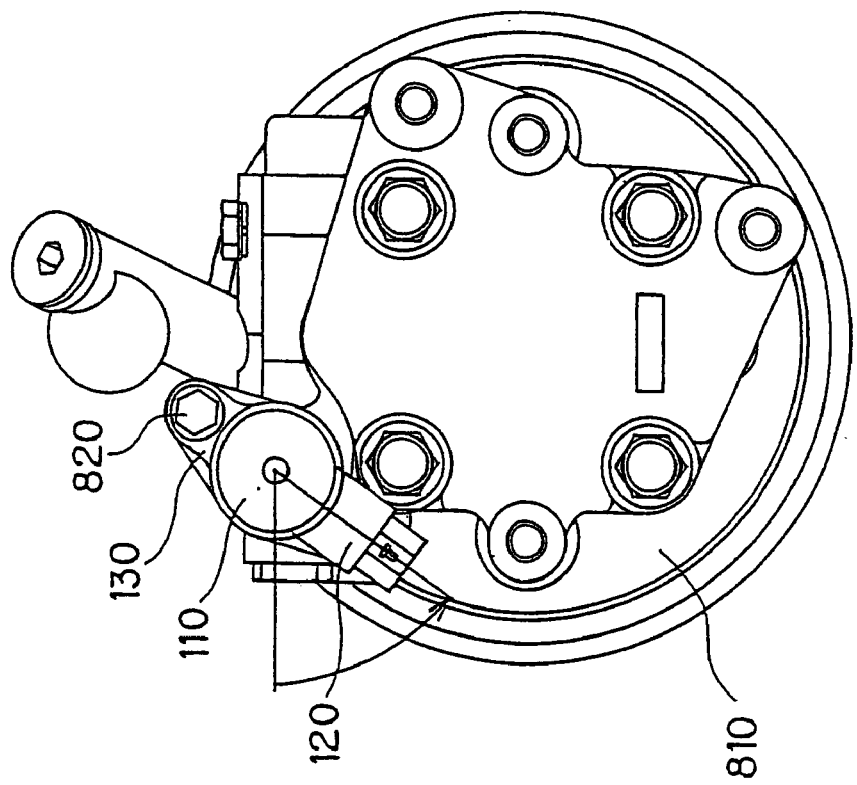

Next, FIG. 4A and FIG. 4B show cases where a mounting angle of the projection 120 such as the connector and a mounting position of the arm piece 130a of the mounting plate portion 130 viewed from the axial direction of the main body are different.

As stated above, when viewed from the axial direction of the main body 110, there is a case where the positions of the projection 120 and the arm piece 130a are aligned with each other, while there is a case where they are slightly misaligned, to both of which the present invention is applicable.

According to the above embodiment, the notched groove 132 is only provided in one arm piece of the mounting plate portion 130, but it can be provided in both of the arm pieces 130a and 130b. This enables both bolts 820 to be preliminarily tightened to a halfway position.

Further, the mounting plate portion 130 includes the pair of arm pieces 130a and 130b, but it is not limited thereto and can be provided with three or more arm pieces. Alternatively, while one arm piece 130a is provided with a notched groove 132, the bolt inserting hole 131b of the other arm piece 130b can be an arc-shaped elongate hole extending in the same circumferential direction as the notched groove 132. In this case, the bolt 820 may preliminarily be inserted into this elongate hole and primarily tightened, and after an alignment, the bolt 820 may finally be tightened.

It is obvious that the present invention is not limited to the above embodiment and includes various variations and improvements one skilled in the art can make within the scope of the appended claims.

What is claimed is:

1. A mounting structure for a component to be fitted into an opening of a structure and fastened to the structure with a bolt, comprising:
    a main body of the component;
    a fitting shaft portion extending axially from the main body and to be fitted into the opening;
    a mounting plate portion connected to a trunk portion of the main body and extending in a direction orthogonal to an axial center of the main body;
    a projection protruding from the axial center of the main body in a direction orthogonal thereto;
    a bolt inserting hole disposed in the mounting plate portion, at least one bolt inserting hole being disposed at a position overlapping with the projection in the axial direction of the main body; and
    a notched groove disposed in the mounting plate portion to connect with the bolt inserting hole disposed at a position overlapping with the projection, the notched groove extending in a substantially circumferential direction of a circle around the fitting shaft portion.

2. The mounting structure for the component according to claim 1, wherein:
    the notched groove is formed to have a groove width equal to or larger than a diameter of the bolt inserting hole.

3. The mounting structure for the component according to claim 1, wherein:
    the mounting plate portion includes at least one pair of arm pieces, and one of the arm pieces is provided with the bolt inserting hole and the notched groove connecting therewith.

4. The mounting structure for the component according to claim 1, wherein:
    the mounting plate portion includes at least one pair of arm pieces, and both arm pieces are provided with the bolt inserting hole and the notched groove connecting therewith, respectively.

5. The mounting structure for the component according to claim 1, wherein:
    the mounting plate portion includes at least one pair of arm pieces, and one of the arm pieces is provided with the bolt inserting hole and the notched groove connecting therewith, while the other arm piece is provided with an elongate hole for insertion of the bolt.

6. A method of mounting a component to be fitted into an opening of a structure and fastened to the structure with a bolt, comprising the steps of:
    providing a main body of the component;
    providing a fitting shaft portion extending axially from the main body and to be fitted into the opening;
    providing a mounting plate portion connected to a trunk portion of the main body and extending in a direction orthogonal to an axial center of the main body;
    providing a projection protruding from the axial center of the main body in a direction orthogonal thereto;
    providing a bolt inserting hole disposed in the mounting plate portion, at least one bolt inserting hole being disposed at a position overlapping with the projection in the axial direction of the main body;
    providing a notched groove disposed in the mounting plate portion to connect with the bolt inserting hole disposed at a position overlapping with the projection, the notched groove extending in a substantially circumferential direction of a circle around the fitting shaft portion;
    performing a primary bolt tightening process in which the bolt is screwed into a bolt screwing hole formed in the structure and is tightened to a halfway position;
    fitting the fitting shaft portion of the component into the opening formed in the structure with the bolt screwed in the bolt screwing hole not interfering with the mounting plate portion after the primary bolt tightening process;
    rotating the main body around the fitting shaft portion to locate the bolt in the bolt inserting hole via the notched groove, and
    performing a secondary bolt tightening process in which the bolt located in the bolt inserting hole is further tightened to closely fix the mounting plate portion to the structure.

* * * * *